United States Patent
Raper et al.

(10) Patent No.: US 9,346,964 B2
(45) Date of Patent: May 24, 2016

(54) PAINT COMPRISING HYDROPHOBIZED MINERALS AND RELATED METHODS

(75) Inventors: Stephen Raper, Marietta, GA (US); David Skelhorn, Cumming, GA (US)

(73) Assignee: Imerys Kaolin, Inc., Roswell, GA (US)

( * ) Notice: Subject to any disclaimer, the term of this patent is extended or adjusted under 35 U.S.C. 154(b) by 676 days.

(21) Appl. No.: 13/634,923

(22) PCT Filed: Mar. 3, 2011

(86) PCT No.: PCT/US2011/027012
§ 371 (c)(1),
(2), (4) Date: Sep. 14, 2012

(87) PCT Pub. No.: WO2011/115755
PCT Pub. Date: Sep. 22, 2011

(65) Prior Publication Data
US 2013/0000518 A1  Jan. 3, 2013

Related U.S. Application Data

(60) Provisional application No. 61/314,959, filed on Mar. 17, 2010.

(51) Int. Cl.
*C09D 5/00* (2006.01)
*C09D 133/00* (2006.01)
(Continued)

(52) U.S. Cl.
CPC .......... *C09D 7/1225* (2013.01); *C04B 20/1025* (2013.01); *C04B 20/1051* (2013.01);
(Continued)

(58) Field of Classification Search
CPC .... B23B 24/148; C23C 30/005; C23C 16/00; C09D 5/00; C09D 133/00; C08K 3/26; C08K 3/34; C08K 3/22; C08K 5/17

USPC ........ 428/698, 701, 702; 427/255.23, 255.28, 427/255.31; 51/307
See application file for complete search history.

(56) References Cited

U.S. PATENT DOCUMENTS

| | | | |
|---|---|---|---|
| 2,948,632 A | 8/1960 | Albert et al. | |
| 4,018,877 A | 4/1977 | Woode | |

(Continued)

FOREIGN PATENT DOCUMENTS

| | | |
|---|---|---|
| EP | 0 406 731 A2 | 1/1991 |
| EP | 1 514 842 A1 | 3/2005 |

(Continued)

OTHER PUBLICATIONS

International Search Report and Written Opinion issued Apr. 19, 2011 in International Application No. PCT/US2011/027012, filed Mar. 3, 2011.

(Continued)

*Primary Examiner* — Pegah Parvini
(74) *Attorney, Agent, or Firm* — Finnegan, Henderson, Farabow, Garrett & Dunner LLP

(57) ABSTRACT

A water-based paint composition may include at least one mineral treated with at least one hydrophobizing agent. The at least one mineral may include at least one of clay, kaolin, mica, titanium dioxide, talc, natural or synthetic silica or silicates, feldspars, nepheline syenite, talc, wollastonite, diatomite, barite, glass, and calcium carbonate. The at least one hydrophobizing agent may include at least one of fatty acids, fatty amines, and silanes. A method of making water-based paint may include treating at least one mineral with a hydrophobizing agent, and combining the at least one treated mineral with a binder.

39 Claims, 14 Drawing Sheets

(51) Int. Cl.
*C09D 7/12* (2006.01)
*C09C 1/02* (2006.01)
*C09C 1/30* (2006.01)
*C09C 1/36* (2006.01)
*C09C 1/40* (2006.01)
*C09C 1/42* (2006.01)
*C09C 3/08* (2006.01)
*C09D 5/02* (2006.01)
*C04B 20/10* (2006.01)
*C04B 26/04* (2006.01)
*C08K 3/26* (2006.01)
*C08K 3/34* (2006.01)
*C08K 9/04* (2006.01)
*C08K 9/06* (2006.01)
*C08K 9/08* (2006.01)
*C04B 103/65* (2006.01)
*C04B 111/00* (2006.01)
*C04B 111/27* (2006.01)

(52) U.S. Cl.
CPC ............... *C04B26/04* (2013.01); *C09C 1/021* (2013.01); *C09C 1/3063* (2013.01); *C09C 1/3081* (2013.01); *C09C 1/3669* (2013.01); *C09C 1/3684* (2013.01); *C09C 1/405* (2013.01); *C09C 1/42* (2013.01); *C09C 3/08* (2013.01); *C09D 5/006* (2013.01); *C09D 5/028* (2013.01); *C01P 2006/62* (2013.01); *C01P 2006/63* (2013.01); *C01P 2006/64* (2013.01); *C04B 2103/65* (2013.01); *C04B 2111/00482* (2013.01); *C04B 2111/27* (2013.01); *C08K 3/26* (2013.01); *C08K 3/34* (2013.01); *C08K 9/04* (2013.01); *C08K 9/06* (2013.01); *C08K 9/08* (2013.01)

(56) References Cited

U.S. PATENT DOCUMENTS

| | | | |
|---|---|---|---|
| 4,191,670 A | | 3/1980 | Strauch et al. |
| 4,415,364 A | | 11/1983 | Naito et al. |
| 4,792,357 A | * | 12/1988 | Bier .............................. 106/600 |
| 5,328,942 A | * | 7/1994 | Akhtar et al. .................... 524/35 |
| 5,550,180 A | * | 8/1996 | Elsik et al. ..................... 524/430 |
| 5,908,708 A | | 6/1999 | Sekutowski et al. |
| 6,342,100 B1 | | 1/2002 | Nover et al. |
| 2007/0093569 A1 | | 4/2007 | Goodall et al. |
| 2009/0238811 A1 | * | 9/2009 | McDaniel .................. A61L 2/00 424/94.2 |

FOREIGN PATENT DOCUMENTS

| | | |
|---|---|---|
| FR | 2 736 922 A1 | 1/1997 |
| WO | WO 90/02779 A1 | 3/1990 |
| WO | WO 2011/115755 A1 | 9/2011 |

OTHER PUBLICATIONS

Excerpt, "Determination of Contrast Ratio, Opacity and Hiding Power" from the internet page: http://www.pra-world.com/technical_services/laboratory/optical/opacity_determination , printed May 14, 2013, 2 pages.
Excerpt, "ASTM D344-11 Standard Test Method for Relative Hiding Power of Paints by the Visual Evaluation of Brushouts" from the internet page: http://www.astm.org/Standards/D344.htm , 1996, 2 pages.
The internet page http://en.wikipedia.org/wiki/Paint , printed May 14, 2013, 6 pages.
Johansson, U., Holmgren, A., Forsling, W., and Frost, R. L., "Adsorption of silane coupling agents onto kaolinite surfaces", Clay Minerals, 1999, pp. 239-246.
Leaflet from the American Coatings Show, Day 3, Apr. 15, 2010, 16 pages.
Google Search for Water dispersible Hydrophobic Minerals for Paint & Coatings, Jun. 25, 2010, 2 pages.
Raper, Steve & Skelhorn, David, "Water dispersible Hydrophobic Minerals for Paint & Coatings", 18 pages.
Saving TIO$_2$ in Semi-Gloss Emulsion Paints with Supreme™, 2009, 2 pages.
Extended European Search Report for European Patent Application No. 11 756 718.0, issued Jun. 25, 2013.
Third Party Observations, European Patent Application No. 11 756 718.0, issued Jul. 8, 2013.

* cited by examiner

20% PVC Gloss Latex Paint

PAINT COMPRISING HYDROPHOBIZED MINERALS AND RELATED METHODS

CLAIM OF PRIORITY/INCORPORATION BY REFERENCE

This application is a U.S. national stage entry under 35 U.S.C. §371 from PCT International Application No. PCT/US2011/027012, filed Mar. 3, 2011, which claims priority to and the benefit of the filing date of U.S. Provisional Application No. 61/314,959, filed Mar. 17, 2010, to both of which this application claims the benefit of priority, and the entirety of the subject matter of both of which is incorporated herein by reference.

FIELD OF THE INVENTION

The present disclosure relates to paint including hydrophobized minerals and related methods. In particular, the present disclosure relates to water-based paint including minerals that have been treated with one or more hydrophobizing agents, and related methods.

BACKGROUND OF THE INVENTION

Paint typically includes one or more pigments, binders, and solvents. Pigments typically include granular solids and/or minerals incorporated into the paint to contribute color, toughness, texture, and/or to act as an extender. Binders are film-forming components of paint, which impart adhesion, bind the pigments together, and may strongly influence properties such as, for example, gloss potential, exterior durability, flexibility, and toughness. Binders typically include synthetic or natural resins, such as, for example, polymers and copolymers based on acrylics, polyurethanes, polyesters, melamine resins, epoxies, and/or oils or other monomeric species. Solvents are considered to be the liquid(s) used in paint, which suspend the pigments and binders, and transport them from a paint applicator to a surface being painted. Once on the surface being painted, the solvent evaporates through drying and/or curing and leaves behind a dry paint film on the painted surface. Water-based paint includes water and dispersing chemicals as solvent rather than mineral spirits or other organic solvents. Water-based paint is often used in commercial and residential applications.

Two characteristics of paint that are often desirable are abrasion resistance, which is often measured as scrub resistance and stain resistance. Scrub resistance relates to the ability to clean a dry paint film without significantly altering the characteristics of the painted finish, for example, by eroding the surface of the dry paint film. Stain resistance relates to the resistance of a dry paint film to be stained in a manner in which the stain cannot be cleaned from the film. These two characteristics are desirable for many common paint uses, such as interior and exterior paint for commercial and residential applications, where it may often be more desirable to clean a painted surface than to repaint the surface.

Thus, it may be desirable to provide compositions for use in paint that improve scrub resistance and/or stain resistance of paint. Further, it may be desirable to provide pigments for use in water-based paint that improve scrub resistance and/or stain resistance in a cost-effective manner.

SUMMARY OF THE INVENTION

In the following description, certain aspects and embodiments will become evident. It should be understood that the aspects and embodiments, in their broadest sense, could be practiced without having one or more features of these aspects and embodiments. Thus, it should be understood that these aspects and embodiments are merely exemplary.

One aspect of the disclosure relates to a water-based paint composition. The composition may include at least one mineral treated with at least one hydrophobizing agent. The paint may include, for example, latex paint. The at least one mineral may include at least one of clay, kaolin, mica, titanium dioxide, talc, natural or synthetic silica or silicates, feldspars, nepheline syenite, wollastonite, diatomite, barite, glass (e.g., cullet), and calcium carbonate. For example, the at least one mineral may include kaolin, such as, for example, at least one of hydrous kaolin, metakaolin, and calcined kaolin. According to some aspects, the at least one mineral may include calcium carbonate, such as, for example, at least one of ground calcium carbonate (GCC) and precipitated calcium carbonate (PCC).

According to some aspects, the at least one hydrophobizing agent may include at least one of fatty acids, fatty amines, and silanes. For example, fatty acids may include one or more of aliphatic carboxylic acids having from ten to thirty carbon atoms in their chain, including but not limited to, stearic acid, behenic acid, palmitic acid, arachidic acid, montanic acid, capric acid, lauric acid, myristic acid, isostearic acid, cerotic acid, and mixtures thereof. For example, the at least one hydrophobizing agent may include fatty acid, such as, for example, stearic acid. In another example, the hydrophobizing agent may include a fatty amine, such as, for example, a fatty amine carbohydrate complex.

According to a further aspect, a method of making water-based paint may include treating at least one mineral with a hydrophobizing agent, and combining the at least one treated mineral with a binder.

According to still a further aspect, a water-based paint composition may include at least one mineral treated with at least one hydrophobizing agent and at least one particulate $TiO_2$ pigment. A film formed from the water-based paint composition may have a contrast ratio at least about 0.1% higher than a similar water-based paint composition wherein the at least one mineral treated with at least one hydrophobizing agent is replaced with an equal volume of said particulate $TiO_2$ pigment.

Additional objects and advantages of the disclosure will be set forth in part in the description which follows, or may be learned by practice of the disclosed embodiments.

Aside from the arrangements set forth above, the embodiments could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this description, illustrate several exemplary embodiments and together with the description, serve to explain the principles of the embodiments. In the drawings.

Figure 1:
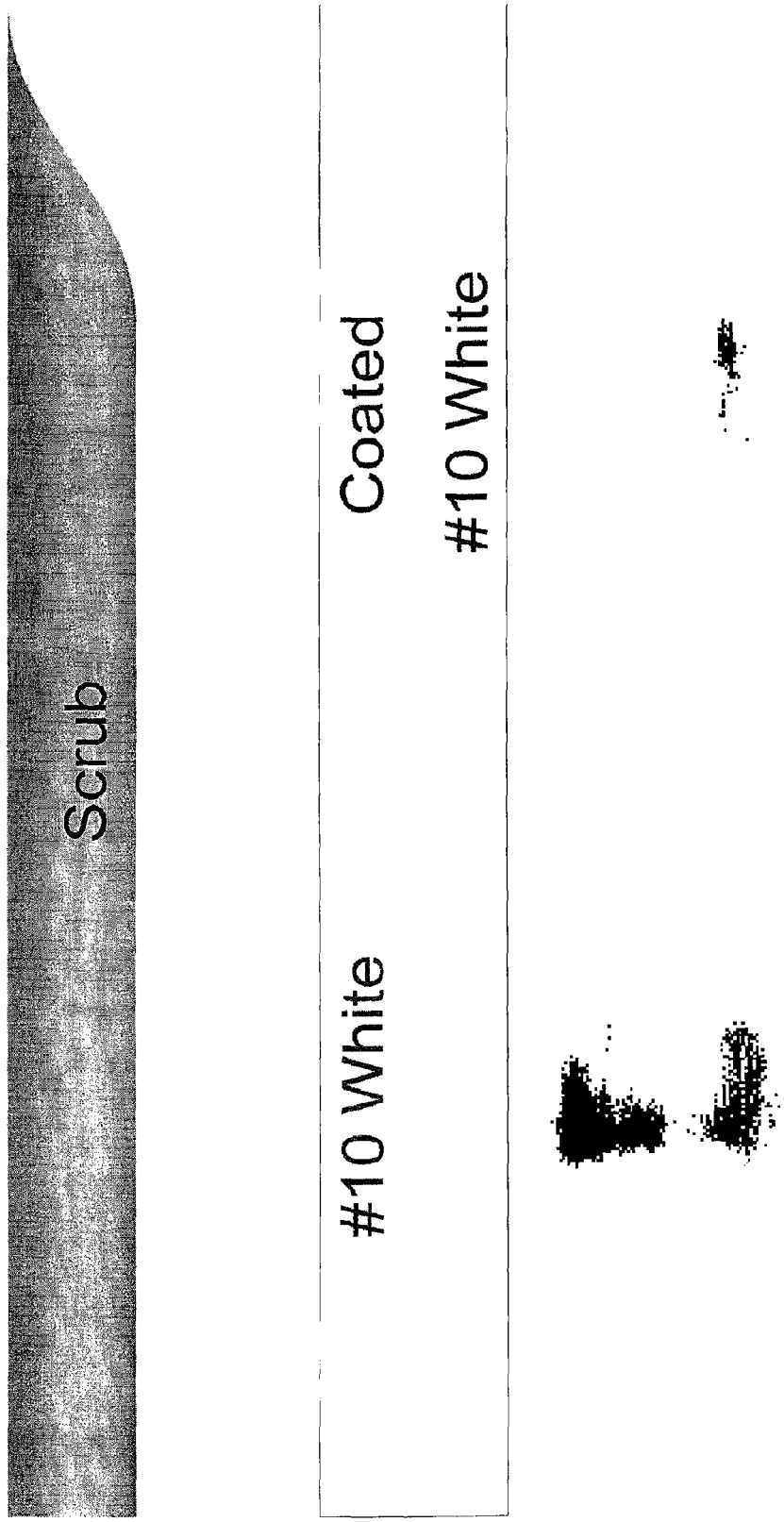
FIG. 1 shows a side-by-side comparison of scrub test results for a water-based paint formulation including untreated calcium carbonate, and the water-based paint formulation including calcium carbonate treated with an exemplary hydrophobizing agent.

DESCRIPTION OF EXEMPLARY
EMBODIMENTS

Reference will now be made in more detail to a number of exemplary embodiments of the invention.

In one aspect, the disclosure relates to paint, including at least one mineral treated with a hydrophobizing agent. For example, the paint may include water-based paint, and the at least one mineral may include at least one of clay, kaolin, mica, and calcium carbonate. For example, the paint may be latex paint, and the at least one mineral may include kaolin, such as, for example, at least one of hydrous kaolin and calcined kaolin. According to some embodiments, the at least one mineral may include calcium carbonate, such as, for example, at least one of granulated calcium carbonate (GCC) and precipitated calcium carbonate (PCC). According to some embodiments, the at least one hydrophobizing agent may include at least one of fatty acids, fatty amines, and silanes. For example, fatty acids may include one or more of aliphatic carboxylic acids having from ten to thirty carbon atoms in their chain, including but not limited to, stearic acid, behenic acid, palmitic acid, arachidic acid, montanic acid, capric acid, lauric acid, myristic acid, isostearic acid, cerotic acid, and mixtures thereof. For example, the at least one hydrophobizing agent may include fatty acid, such as, for example, stearic acid. In another example, the at least one hydrophobizing agent may include a fatty amine, such as, for example, a fatty amine carbohydrate complex.

According to some embodiments, hydrophobizing agents may be chosen from metal stearates, ammonium stearate, titanate coupling agents, silicones and organo-silicones, organo-silanes, fluorocarbons, fatty acid amines and amides, quaternary amine compounds, hydrocarbon oils, hydrocarbon waxes, hydrocarbon resins, zirconium compounds, maleic anhydride, maleic anhydride grafted polymers (e.g., modified polyethylene and/or polypropylene), carboxylated polybutadiene, and organometallic compounds.

In some embodiments, the mineral may be treated with 0.1% to 10% by weight of the hydrophobizing agent, such as, for example, from 1% to 5% by weight hydrophobizing agent.

It has been found that contrary to conventional wisdom, treating minerals for use in water-based paint with hydrophobizing agents may result in improved scrub resistance and/or stain resistance of the dry paint film. Conventional wisdom would suggest that treating minerals for use in water-based paints with hydrophobizing agents would lead to unacceptable results because, for example, the treated minerals would be hydrophobic and would thus not be compatible with the water solvent of water-based paint. For example, some minerals treated with hydrophobizing agents float on top of water-based paint, thus leading one to believe that including the treated minerals in water-based paints would lead to undesirable characteristics. In contrast to conventional wisdom, however, it has been found that treating minerals for water-based paints with hydrophobizing agents may result in improved scrub resistance and/or stain resistance of dry paint films of water-based paints.

According to some embodiments, the minerals may include kaolin, for example, a calcined kaolin having a mean particle size ($d_{50}$) of about 1.5 microns, such as a calcined kaolin product marketed under the trademark GLOMAX LL by IMERYS. According to some embodiments, the minerals may include calcium carbonate, for example, a ground calcium carbonate product marketed under the trademark #10 WHITE by IMERYS.

Ground calcium carbonate may include ground, naturally occurring calcium carbonate from limestone sources, such as, for example, marble, limestone, dolomite, chalk, and "reef limestone". According to some embodiments, the minerals may include precipitated calcium carbonate. Precipitated calcium carbonate may be generally prepared by a process in which calcium carbonate is calcined to produce calcium oxide, or "quicklime." The quicklime is thereafter "slaked" with water to produce an aqueous slurry of calcium hydroxide, and finally, the calcium hydroxide is carbonated with a carbon-dioxide-containing gas to produce precipitated calcium carbonate, which may be subsequently processed by further grinding and drying to produce a dry powder form.

Number 10 WHITE, also known as #10 WHITE, is an example of a white, ground calcium carbonate from a marble source with an average particle size of 12 microns and 325 mesh residue of approximately 0.5%. Other ground calcium carbonates may be produced by wet grinding or dry grinding and may have an average particle diameter between 0.3 microns and 25 microns or more preferably between 1 micron and 12 microns measured by Sedigraph method.

GLOMAX LL is an example of a conventional white calcined clay with an average particle size, by Sedigraph method, of 1.4 microns. However, other calcined clays may also be used, for example, calcined clays manufactured by either soak-calcination or flash calcination at temperatures above 600 degrees Celsius with average particle sizes from 0.2 microns to 15 microns, such as for example from 0.6 microns to 5.0 microns, and with oil absorptions from 40 g/100 g to 135 g/100 g by spatula rub-out method.

According to some embodiments, paints disclosed herein may include for example, architectural paints, such as textured decorative paints, including, for example, aggregated calcium carbonate. According to some embodiments, paints disclosed herein may have desirable optical properties, such as, for example, dry paint films having a low sheen and high opacity.

According to some embodiments, dry paint film produced from the exemplary paints disclosed herein may exhibit specified properties of color. For example, components L, a, and b are color component values of a 3-dimensional color space scale, which may be measured by, for example, a Hunter Ultrascan XE instrument. On the color space scale, "L" is a measure of Whiteness, "+a" is a measure of Redness, "−a" is a measure of Greenness, "+b" is a measure of Yellowness, "−b" is a measure of Blueness. Whiteness (YI) can be measured according to the ASTM-E-313 standard method. It is to be appreciated that the relative color of paint can be "lighter" (e.g., appearing less blue) or "darker" (e.g., appearing more blue). In the case of tint strength, "lighter" colored paint (i.e., paint having a higher L value) is considered to have the higher tint strength after addition of a darker pigment.

Another optical property of dry paint film is referred to as "457 brightness," which can be measured using a standard method, such as, for example, by using ASTM D 985-97. The 457 brightness property is a measure of the directional reflectance of a surface at a wavelength of 457 nanometers.

Yet a further optical property of dry paint film is opacity, also known as contrast ratio. Dry paint film opacity is related to light scattering and light absorption, which may occur when light travels through two or more different materials, as different materials typically have different refractive indices. In a pigmented paint, light may be scattered by both the pigment and extender, as well as cavities or voids and may also be absorbed by the pigment system. Thus, to maximize opacity, it is generally desirable to maximize light scattering by the pigment/extender and voids or cavities and/or by absorption of light by absorbent species.

The exemplary paints disclosed herein may also include at least one additive chosen from conventional additives, such as, for example, pigments other than the mineral-based pigments disclosed herein, surfactants, thickeners, defoamers, wetting agents, dispersants, solvents, and coalescents, as well as other functional additives. Exemplary paints include textured paints, latex paints, and acrylic paints.

According to some embodiments, the paint may have a pigment volume concentration (PVC) ranging from, for example, about 5% to about 90%, from about 40% to about 70%, or from about 40% to about 50%. According to some embodiments, the paint may have a pigment volume concentration ranging from, for example, about 50% to about 60%, or from about 60% to about 70%. In other embodiments, the paint has a pigment volume concentration of at least about 70%, such as, from about 70% to about 85%. As used herein, "pigment volume concentration" (PVC) is defined according to the following equation:

$$PVC = \frac{\text{volume of pigments}}{\text{volume of pigments} + \text{volume of binder}}.$$

The present disclosure is further illustrated by the following non-limiting examples, which are intended to be purely exemplary of the invention. In the examples shown below, the following abbreviations are used:

EXAMPLES

Preparation of Examples

Seven pairs of test samples were prepared for comparison according to the standard mixing procedure now described. A Cowles high speed mixer was used having a dispersion blade running with a tip speed of approximately 2500 ft/minute. A mill base was prepared by incorporation of the pigments into a dispersion consisting of dispersant, stabilizer, and defoamer additives in water. This was mixed until a Hegman value of 4 (or other acceptable measure of dispersion) was achieved, when thickener was added and run until a stable vortex was formed. At this point the mixer speed was reduced and the latex added, followed finally by coalescent chemicals.

Samples of the mineral were hydrophobized where indicated, by coating the dry mineral with hydrophobizing agent by blending in a Waring blender. Prior to addition to the blender, the hydrophobizing agent was heated to a temperature in excess of its melting point (e.g., 95 degrees C.).

Example 1

In a first test pair, a first water-based paint formulation (Sample 1) was prepared by incorporating untreated ground calcium carbonate (#10 White), and untreated calcined kaolin (GLOMAX LL), into a standard 65% PVC formulation shown below in Table I. A second water-based paint formulation (Sample 2) was prepared that was the same as the first paint formulation of this example, except that the calcium carbonate composition was hydrophobized by treating it with 2.5% by weigh in comparison to the mineral of the hydrophobizing agent. In all present examples, the hydrophobizing agent used was a fatty amine carboxylate complex (RAYBO 57 Optisperse HS, available from Raybo Chemical Company, Huntington W. Va., US).

The hydrophobizing agent was reacted with the calcium carbonate while mixing at a temperature above 70 degrees Celsius in order to melt the fatty amine carboxylate complex and to cause it to coat surfaces of the calcium carbonate particles.

The ratio of hydrophobizing agent-to-calcium carbonate can be adjusted based on the surface area of the calcium carbonate. However, it is \desirable to achieve monolayer coverage of the surface, although lower or higher addition levels may be satisfactory. For ground calcium carbonates coated with fatty amine carboxylate complex, this ratio can be between 0.2-to-99.8 and 4.0-to-96.0, and is more typically 1.0-to-99.0.

Table I below provides a listing of the components of the exemplary paint formulations of Example 1. The following list is a legend for the abbreviations listed in Table I:

KTPP is potassium tripolyphosphate

TAMOL 731=is a surfactant or wetting agent, which includes a sodium salt of polycarboxylated condensed naphthalene, which may be available from Rohm and Haas Company.

IGEPAL CO-610 is an Ethoxylated Nonyl Phenol, which may be available from Rhodia, Inc.

COLLOIDS 681F (now Rhodoline 681F) is a liquid defoamer, which may be available from Rhodia, Inc.

$TiO_2$ (R-706) is a rutile titanium oxide pigment, which may be available from DuPont.

10 WHITE is a ground calcium carbonate product available from IMERYS.

GLOMAX LL is a calcined kaolin product available from IMERYS.

NATROSOL PLUS is a hydrophobically-modified hydroxyethylcellulose (HMHEC) thickener, which may be available from Hercules Inc.

UCAR 379 is a Latex Vinyl Acrylic copolymer, which may be available from The Dow Chemical Company.

TEXANOL is an ester alcohol-based coalescent, which may be available from Eastman Kodak Company. The chemical formula for TEXANOL is 2,2,4-trimethyl-1,3-pentanediol monoisobutyrate.

TABLE I

| MATERIAL | GALLONS | LBS | TOTAL |
|---|---|---|---|
| WATER | 41.65 | 346.91 | 29.05% |
| KTPP | 0.09 | 1.80 | 0.15% |
| TAMOL 731 | 0.87 | 8.00 | 0.67% |
| IGEPAL CO-610 | 0.46 | 4.00 | 0.33% |
| COLLOIDS 681F | 0.41 | 3.00 | 0.25% |
| $TiO_2$ (R-706) | 2.45 | 81.67 | 6.84% |
| #10 WHITE | 11.24 | 252.99 | 21.19% |
| GLOMAX LL | 9.12 | 199.91 | 16.74% |
| NATROSOL PLUS | 0.43 | 3.94 | 0.33% |
| High speed disperse | | | |
| UCAR 379 Latex | 23.70 | 210.96 | 17.67% |
| ETHYLENE GLYCOL | 2.69 | 24.99 | 2.09% |
| TEXANOL | 1.36 | 10.00 | 0.84% |
| WATER | 5.52 | 45.98 | 3.85% |
| TOTAL PAINT | 100.00 | 1194.14 | 100.00% |

The dry film properties of the two water-based paint formulations in Example 1 are shown in Table II below.

TABLE II

| PROPERTIES 65% PVC | SAMPLE 1 | SAMPLE 2 |
|---|---|---|
| 60 Deg Gloss | 2.8 | 2.7 |
| 85 Deg Sheen | 2.8 | 2.6 |
| L | 95.37 | 94.74 |
| a | −0.84 | −0.90 |
| b | 1.91 | 2.11 |
| Opacity (Y) | 94.57 | 94.52 |
| WI E313(2/C) | 82.15 | 79.95 |
| YI E313(2/C) | 3.06 | 3.44 |
| 457 Brightness | 88.81 | 87.35 |

WI is Whiteness Index according to ASTM E313 (2/C) and YI is Yellowness Index to ASTM E313 (2/C). As shown in Table II, there is very little change in the listed properties of the dry paint film for the first formulation, which does not include minerals treated with a hydrophobizing agent, relative to the second formulation, which includes minerals treated with a hydrophobizing agent. However, as explained below, the second formulation exhibits improved scrub resistance.

Following preparation of the two paint formulations, a scrub test was performed on both to determine whether one of the two formulations had a higher scrub resistance. The scrub test used is described in ASTM D2486 Method B, which describes a method for side by side comparison of the abrasion resistance of two paint films, which are prepared simultaneously on the same test sheet. According to the scrub test, a coating of paint having a predetermined thickness is applied to a sample card having a surface color that contrasts with the color of the applied paint sample. The paint is allowed to dry and may be cured under predetermined conditions, such that a dry paint film of the paint sample is obtained. An abrasive material is rubbed across the dry paint film using a reciprocating brush according to controlled procedures. The amount of the surface of the sample card showing through the dry paint film following the rubbing of the abrasive material provides an indication of the scrub resistance of the paint being tested. In particular, a paint that reveals less of the surface of the sample card than another paint to which the first paint is being compared, has a greater scrub resistance. As shown in FIGS. 1-7, the sample card showing less of the darker color (i.e., the color of the surface of the sample card prior to application of the paint sample) has a higher scrub resistance.

FIG. 1 shows a side-by-side comparison of scrub test results for the first paint formulation of Example 1 on the left and for the second paint formulation on the right. As can be seen from FIG. 1, the second paint formulation, in particular, the paint formulation which included the calcium carbonate treated with the exemplary hydrophobizing agent, reveals less of the surface of the sample card. Thus, the second paint formulation of Example 1 exhibits improved scrub resistance relative to the first formulation, which includes the untreated calcium carbonate.

Example 2

In a second test pair, a first water-based paint formulation was prepared by incorporating untreated calcium carbonate into the low volatile organic content (VOC) 65% PVC formulation shown below in Table III. A second water-based paint formulation was prepared that was the same as the first paint formulation of this example, except that the calcium carbonate was treated with Raybo 57 hydrophobizing agent prior to incorporation into the paint composition. Both the first and the second paint formulations were cured at room temperature.

TABLE III

| MATERIAL | GALLONS | LBS | TOTAL |
|---|---|---|---|
| WATER | 41.6 | 346.9 | 29.1% |
| KTPP | 0.1 | 1.8 | 0.2% |
| TAMOL 731 | 0.9 | 8.0 | 0.7% |
| IGEPAL CO-610 | 0.5 | 4.0 | 0.3% |
| COLLOIDS 681F | 0.4 | 3.0 | 0.3% |
| $TiO_2$ (R-706) | 2.5 | 81.7 | 6.8% |
| #10 WHITE | 11.2 | 253.0 | 21.2% |

TABLE III-continued

| MATERIAL | GALLONS | LBS | TOTAL |
| --- | --- | --- | --- |
| GLOMAX LL | 9.1 | 199.9 | 16.8% |
| NATROSOL PLUS | 0.4 | 3.9 | 0.3% |
| High speed disperse | | | |
| ECOVAE 401 LATEX | 23.7 | 211.0 | 17.7% |
| WATER | 9.6 | 79.7 | 6.7% |
| TOTAL PAINT | 100.00 | 1192.91 | 100.00% |

Figure 2:
FIG. 2 shows a side-by-side comparison of scrub test results for a water-based paint formulation including untreated calcium carbonate, and the water-based paint formulation including calcium carbonate treated with the exemplary hydrophobizing agent, with both water-based paint formulations being cured at room temperature.
Figure 2:

FIG. 2 shows a side-by-side comparison of scrub test results for the first paint formulation of this example on the left and for the second paint formulation on the right. As can be seen from FIG. 2, the second paint formulation, including the calcium carbonate mineral treated with the exemplary hydrophobizing agent, exhibits improved scrub resistance.

Example 3

In a third test pair, a first water-based paint formulation was prepared by incorporating untreated calcined kaolin into the low VOC 65% PVC formulation shown in Table III. A second water-based paint formulation was prepared that was the same as first paint formulation of this example, except that the calcined kaolin composition was treated with Raybo 57 hydrophobizing agent prior to incorporation into the paint formulation, such that the calcined kaolin particles were coated with hydrophobizing agent. Both the first and the second paint formulations were cured at room temperature.

Figure 3:
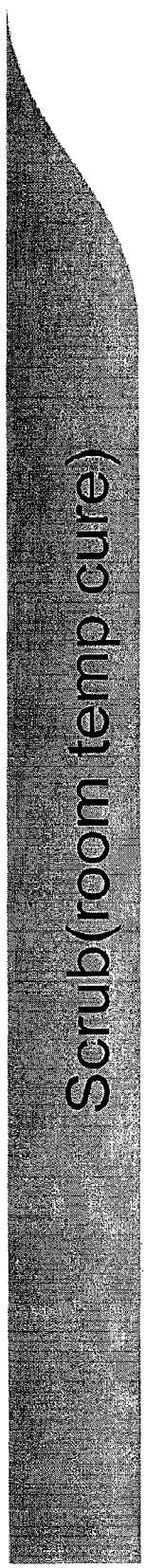
FIG. 3 shows a side-by-side comparison of scrub test results for a water-based paint formulation including untreated calcined kaolin, and the water-based paint formulation including calcined kaolin composition treated with the exemplary hydrophobizing agent, with both water-based paint formulations being cured at room temperature.
Figure 3:
Figure 3:

FIG. 3 shows a side-by-side comparison of scrub test results for the first paint formulation of this example on the left and for the second paint formulation on the right. As can be seen from FIG. 3, the second paint formulation, including the calcined kaolin composition treated with the exemplary hydrophobizing agent, exhibits improved scrub resistance.

Example 4

In a fourth test pair, a first water-based paint formulation was prepared by incorporating untreated calcined kaolin and untreated calcium carbonate into the low VOC 65% PVC formulation shown in Table III. A second water-based paint formulation was prepared that was the same as the first paint formulation of this example, except that the calcined kaolin and calcium carbonate compositions were treated with Raybo 57 hydrophobizing agent prior to incorporation into the paint formulation, such that the calcined kaolin particles and the calcium carbonate particles were treated with hydrophobizing agent. Both the first and the second paint formulations were cured at room temperature.

Figure 4:
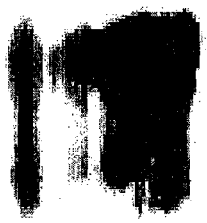
FIG. 4 shows a side-by-side comparison of scrub test results for a water-based paint formulation including an untreated calcined kaolin and calcium carbonate, and the water-based paint formulation including calcined kaolin and calcium carbonate compositions treated with the exemplary hydrophobizing agent, with both water-based paint formulations being cured at room temperature.
Figure 4:
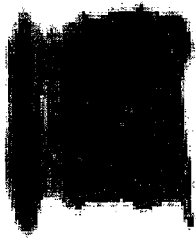

FIG. 4 shows a side-by-side comparison of scrub test results for the first paint formulation of this example on the left and for the second paint formulation on the right. As can be seen from FIG. 4, the second paint formulation, including the minerals treated with the exemplary hydrophobizing agent, exhibits improved scrub resistance.

Example 5

In a fifth test pair, a first water-based paint formulation was prepared by incorporating untreated calcium carbonate into the low VOC 65% PVC formulation shown in Table III. The low VOC formulation uses a commercially available latex polymer, which does not require the use of coalescent agents. A second water-based paint formulation was prepared that was the same as the first paint formulation of this example, except that the calcium carbonate composition was treated with Raybo 57 hydrophobizing agent prior to incorporation into the paint formulation, such that the calcium carbonate particles of the calcium carbonate composition were coated with hydrophobizing agent. Both the first and the second paint formulations were cold-cured. Cold curing was undertaken by placing the freshly prepared paint film in an environmental chamber at 9 degrees Celsius for 24 hours to simulate application of paint in winter conditions.

Figure 5:
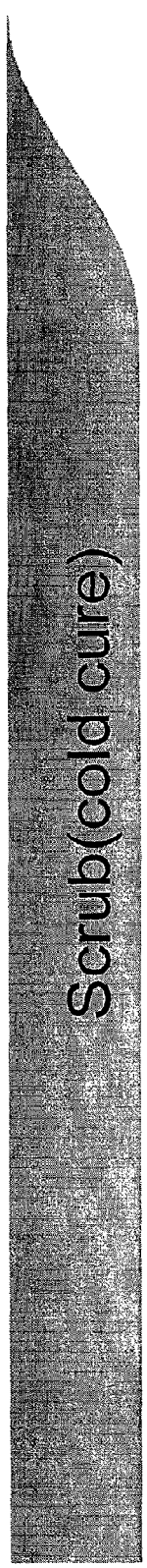
FIG. 5 shows a side-by-side comparison of scrub test results for a water-based paint formulation including untreated calcium carbonate, and the water-based paint formulation including calcium carbonate composition treated with the exemplary hydrophobizing agent, with both water-based paint formulations being cold-cured.
Figure 5:

FIG. 5 shows a side-by-side comparison of scrub test results for the first paint formulation of this example on the left and for the second paint formulation on the right. As can be seen from FIG. 5, the second paint formulation, including the mineral treated with the exemplary hydrophobizing agent, exhibits improved scrub resistance.

Example 6

In a sixth test pair, a first water-based paint formulation was prepared by incorporating untreated calcined kaolin into the low VOC 65% PVC formulation shown in Table III. A second water-based paint formulation was prepared that was the same as the first paint formulation of this example, except that the calcined kaolin composition was treated with Raybo 57 hydrophobizing agent prior to incorporation into the paint formulation. Both the first and the second paint formulations were cold-cured.

Figure 6:
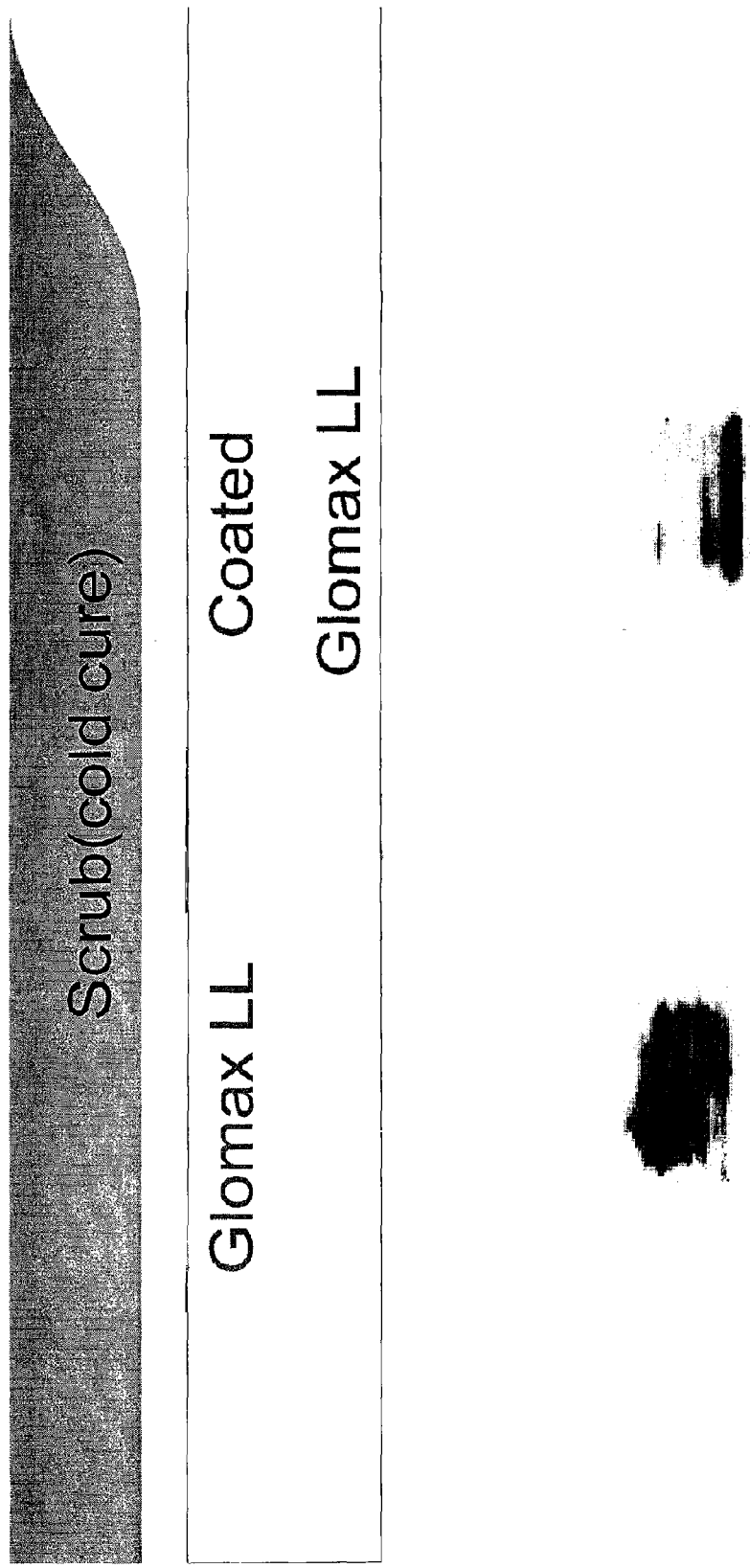
FIG. 6 shows a side-by-side comparison of scrub test results for a water-based paint formulation including untreated calcined kaolin, and the water-based paint formulation including calcined kaolin composition treated with the exemplary hydrophobizing agent, with both water-based paint formulations being cold-cured.

FIG. 6 shows a side-by-side comparison of scrub test results for the first paint formulation of this example on the left and for the second paint formulation on the right. As can be seen from FIG. 6, the second paint formulation, including the mineral treated with the exemplary hydrophobizing agent, exhibits improved scrub resistance.

Example 7

In a seventh test pair, a first water-based paint formulation was prepared by incorporating untreated calcined kaolin and untreated calcium carbonate into the low VOC 65% PVC formulation shown in Table III. A second water-based paint formulation was prepared that was the same as the first paint formulation of this example, except that the calcined kaolin and calcium carbonate compositions were treated with Raybo 57 hydrophobizing agent prior to incorporation into the paint formulation, such that the calcined kaolin particles and the calcium carbonate particles were coated with hydrophobizing agent. Both the first and the second paint formulations were cold-cured at 9 degrees Celsius.

Figure 7:
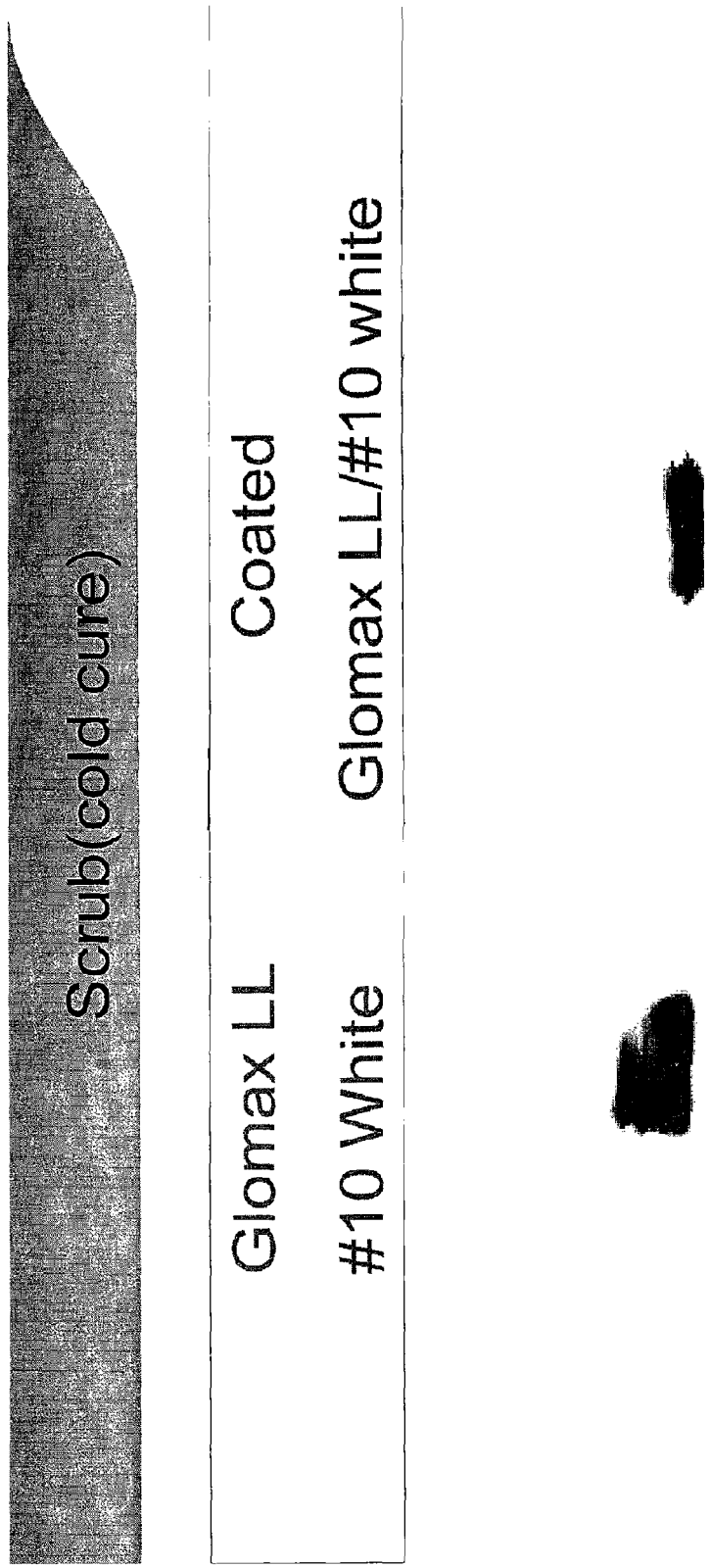
FIG. 7 shows a side-by-side comparison of scrub test results for a water-based paint formulation including untreated calcined kaolin and calcium carbonate, and the water-based paint formulation including calcined kaolin and calcium carbonate compositions, both treated with the exemplary hydrophobizing agent, with both water-based paint formulations being cold-cured.

FIG. 7 shows a side-by-side comparison of scrub test results for first paint formulation of this example on the left and for the second paint formulation on the right. As can be seen from FIG. 7, the second paint formulation, including the minerals treated with the exemplary hydrophobizing agent, exhibits improved scrub resistance.

As shown by Examples 1-7, treating minerals such as kaolin and calcium carbonate with a hydrophobizing agent results in improved scrub resistance for water-based paints. Both the treated calcium carbonate minerals and the treated calcined kaolin minerals exhibited improved scrub resistance relative to corresponding untreated minerals. Further, treated minerals improved scrub resistance, regardless of the method of curing the paint. Thus, although rendering the minerals hydrophobic by such treatment would not be expected to provide acceptable results with water-based paints, the test results indicate that incorporating hydrophobic minerals into water-based paint results in improved scrub resistance.

The dry film properties of four exemplary water-based paint formulations are shown in Table IV below. In particular, the dry film properties are shown for:

(1) a first paint formulation incorporating untreated calcined kaolin and untreated calcium carbonate into the low VOC 65% PVC formulation shown in Table III;

(2) a second paint formulation incorporating untreated calcined kaolin and treated calcium carbonate composition into the low VOC 65% PVC formulation shown in Table III;

(3) a third paint formulation incorporating untreated calcium carbonate and treated calcined kaolin composition into the low VOC 65% PVC formulation shown in Table III; and (4) a fourth paint formulation incorporating treated calcium carbonate composition and treated calcined kaolin composition into the low VOC 65% PVC formulation shown in Table III.

TABLE IV

|  | Sample 1 | Sample 2 | Sample 3 | Sample 4 |
|---|---|---|---|---|
| Coated #10 | no | yes | no | yes |
| Coated Glomax LL | no | no | yes | yes |
| 60 Deg Gloss | 2.9 | 2.8 | 2.7 | 2.8 |
| 85 Deg Sheen | 2.6 | 2.6 | 2.3 | 2.3 |
| L | 94.83 | 94.77 | 93.89 | 93.61 |
| a | −0.67 | −0.73 | −0.77 | −0.81 |
| b | 1.80 | 2.15 | 2.71 | 2.67 |
| Opacity (Y) | 93.70 | 92.68 | 92.12 | 91.80 |
| WI E313(2/C) | 81.58 | 79.83 | 75.44 | 75.06 |
| YI E313(2/C) | 3.01 | 3.64 | 4.74 | 4.65 |
| 457 Brightness | 87.92 | 87.33 | 84.98 | 84.51 |

Similar to Table II above, Table IV shows that there is very little change in the properties of the dry paint film shown in Table IV for the formulations that do not include minerals treated with a hydrophobizing agent, relative to the formulations that include minerals treated with a hydrophobizing agent. However, as explained above, the treated formulations exhibit improved scrub resistance.

Example 8

In an eighth test pair, a first water-based paint formulation was prepared by incorporating untreated calcined kaolin and untreated calcium carbonate into the low VOC 65% PVC formulation shown in Table III. A second water-based paint formulation was prepared that was the same as the first paint formulation of this example, except that the calcined kaolin and calcium carbonate compositions were treated with 2.5% by weight Raybo 57 hydrophobizing agent prior to incorporation into the paint formulation. Both the first and the second paint formulations were cold-cured at 9 degrees Celsius.

Following preparation of the two paint formulations, a stain resistance test was performed on both to determine whether one of the two formulations had a higher stain resistance. In the stain resistance test, a coating of paint approximately 3 mils thick is applied to a sample card having a surface color that contrasts with the color of the applied paint sample. The paint is allowed to dry for at least 24 hours to obtain a dry paint film of the paint sample. Various staining agents (i.e., oil, mustard, red wine, and ink) were then applied to the film and allowed to stand for 30 seconds to 1 minute, unless otherwise noted. The excess staining agent was then wiped off with a dry paper towel. All of the samples with the exception of the ink were then cleaned with a standardized non-abrasive scrub media in conformance with ASTM Method D3450. The ink sample was cleaned by using a paper towel soaked in mineral spirits to wipe off the remaining staining agent. The films were then dried by wiping with a dry paper towel.

Figure 8:
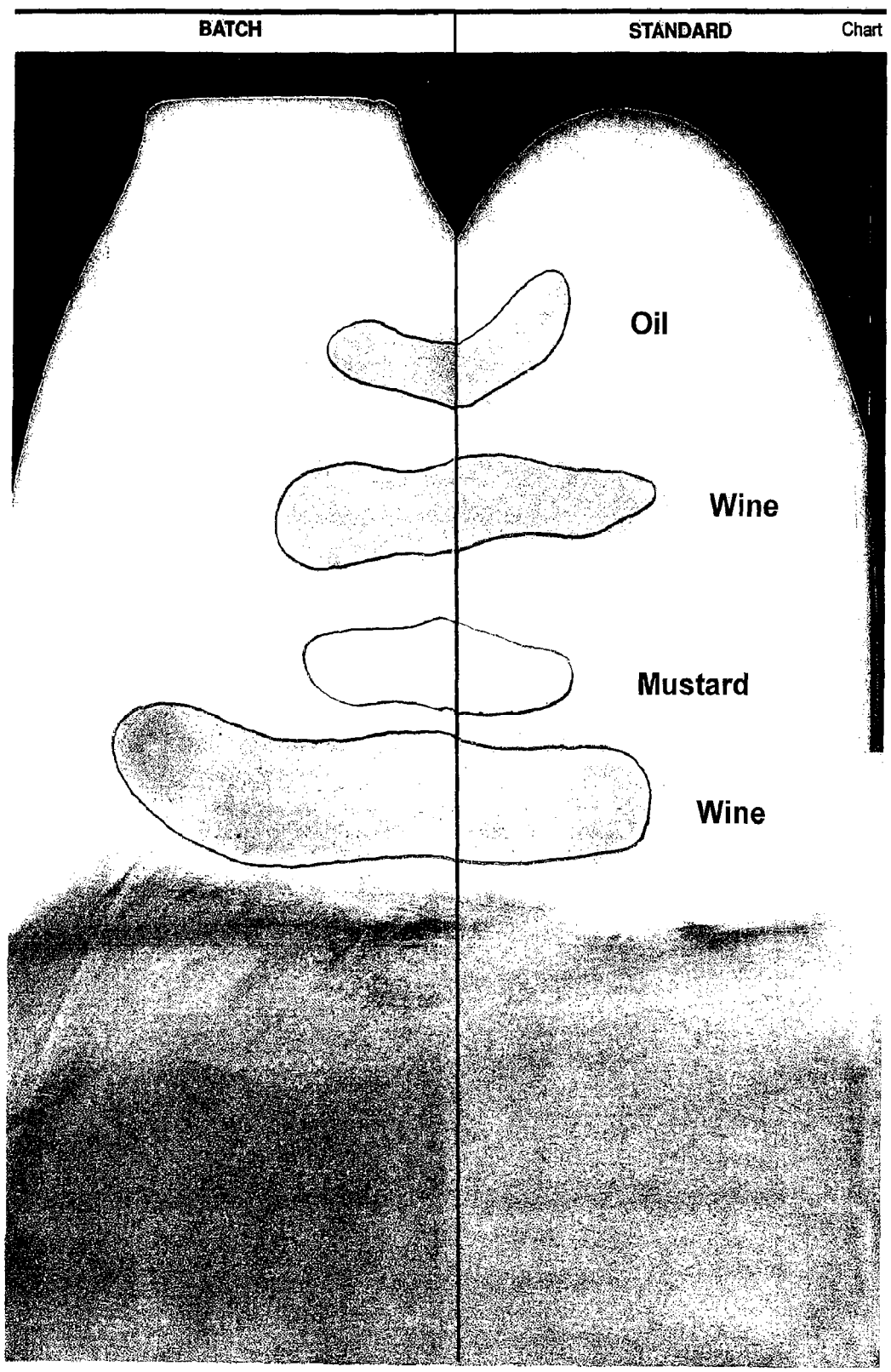
FIG. 8 shows a side-by-side comparison of stain resistance test results for a water-based paint formulation including untreated calcined kaolin and calcium carbonate, and the water-based paint formulation including calcined kaolin and calcium carbonate compositions, both treated with the exemplary hydrophobizing agent, with both water-based paint formulations being cold-cured.

FIG. 8 shows a side-by-side comparison of stain resistance test results for the first paint formulation of this example on the left and for the second paint formulation on the right. From top to bottom, the stains are corn oil, red wine, mustard, red wine (1 hr contact time), and ink (Special Test Compound S68 available from K&N Corp.).

As can be seen from FIG. 8, the second paint formulation, including the minerals treated with the exemplary hydrophobizing agent, exhibits markedly improved stain resistance for oil and ink stains, and appears comparable to slightly better than formulations using the untreated minerals for the wine and mustard stains.

Example 9

Paint samples were prepared using the general formulation shown in Table V, but with different pigments. A control sample was prepared using $TiO_2$ as the only pigment. In the test paints the $TiO_2$ was reduced in steps from 202 to 65 pounds per 100 gallons and replaced by volume by either a 1 micron stearate coated calcium carbonate (Camel-Cal ST, available from Imerys), a 0.7 micron stearate coated calcium carbonate (Imerseal 75, available from Imerys), and a 1 micron uncoated Calcium carbonate.

TABLE V

| Standard 20% PVC Formulation | |
|---|---|
| MATERIAL | LBS |
| WATER | 111.5 |
| COLLOIDS 226 | 7.4 |
| IGEPAL CO-630 | 2.8 |
| AMP-95 | 3.7 |
| COLLOIDS 691 | 5.6 |
| TIO2(R-706) | 202.5 |
| NATROSOL PLUS | 2.8 |
| HIGH SPEED DISPERSE | |
| AQUAMAC 440 | 483.0 |
| ETHYLENE GLYCOL | 27.9 |
| TEXANOL | 36.4 |
| WATER | 111.5 |
| ACRYSOL TT-935 | 1.4 |
| AMMONIA | 1.9 |
| WEIGHT SOLIDS: | 43.4% |
| VOLUME SOLIDS: | 31.9% |

Figure 9:
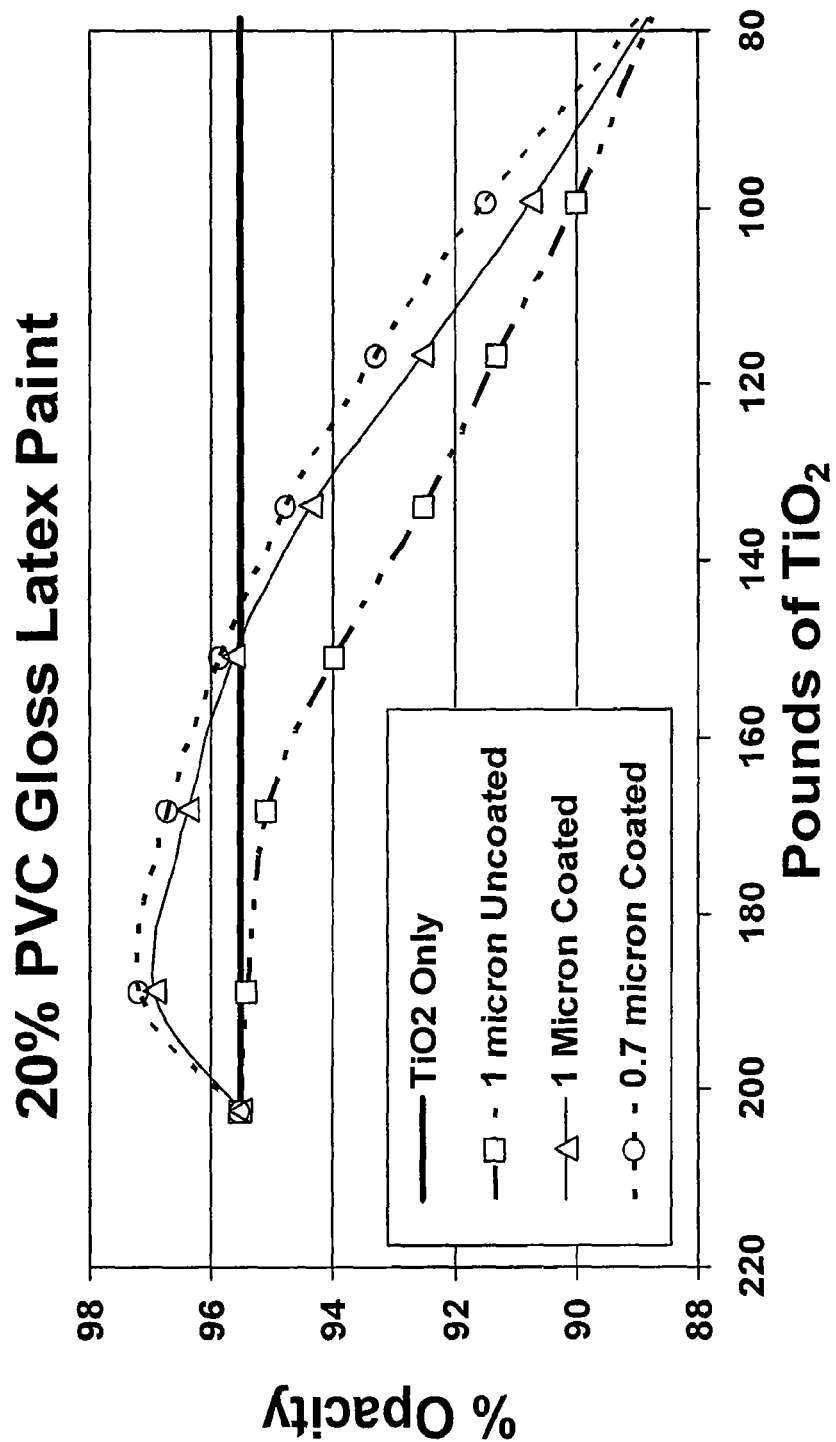
FIG. 9 is a graph of opacity vs. amount of $TiO_2$ content for several paint samples prepared with different pigments, including pigments comprising coated and uncoated calcium carbonate.

The results are shown in FIG. 9. It appears that up to about 20% of the $TiO_2$ content can be replaced with 1 micron stearate coated calcium carbonate while maintaining opacity comparable to that of the $TiO_2$ sample. Similarly, up to about 30% of the $TiO_2$ content can be replaced with 0.7 micron stearate coated calcium carbonate while maintaining opacity comparable to that of the $TiO_2$ sample. In contrast, the uncoated calcium carbonate shows a much more immediate decrease in opacity when used as a replacement for $TiO_2$.

Example 10

Figure 10:
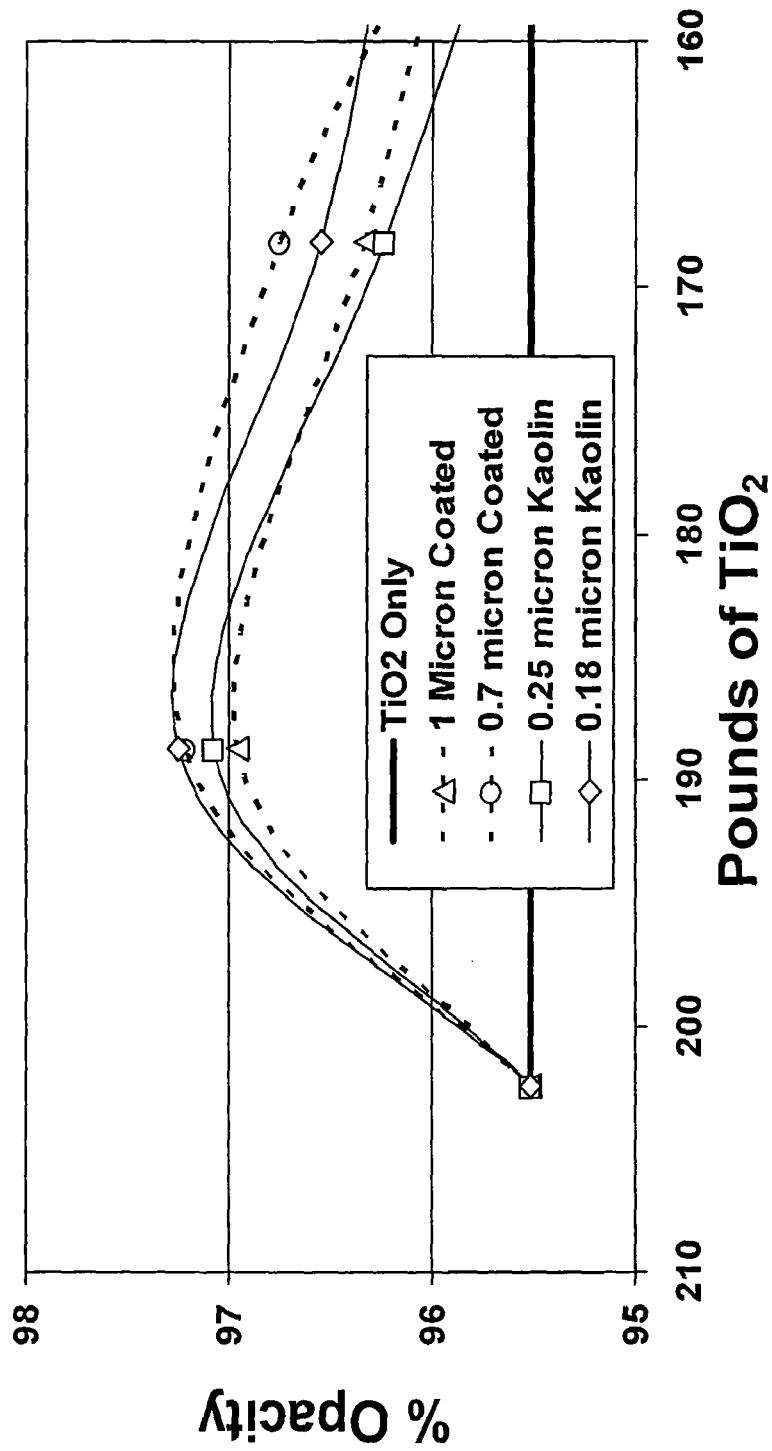
FIG. 10 a graph of opacity vs. amount of $TiO_2$ content for several paint samples prepared with different pigments, including pigments comprising coated calcium carbonate and pigments comprising uncoated hydrous kaolin.

Using the same base 20% PVC formulation as Example 9, the $TiO_2$ was replaced by volume with premium hydrous kaolins, a fine hydrous kaolin (ASP G90, available from BASF/Engelhard) and an ultrafine hydrous kaolin (Polygloss 90, available from Kamin). Neither hydrous kaolin was coated. FIG. 10 compares these results with those of the coated calcium carbonate samples from Example 9.

As shown in FIG. 10, the opacity obtained by replacing TiO₂ with the 1 micron stearate coated carbonate or the 0.7 micron calcium carbonate is similar to that obtained by replacing TiO₂ with either of the premium hydrous kaolins.

Figure 11:
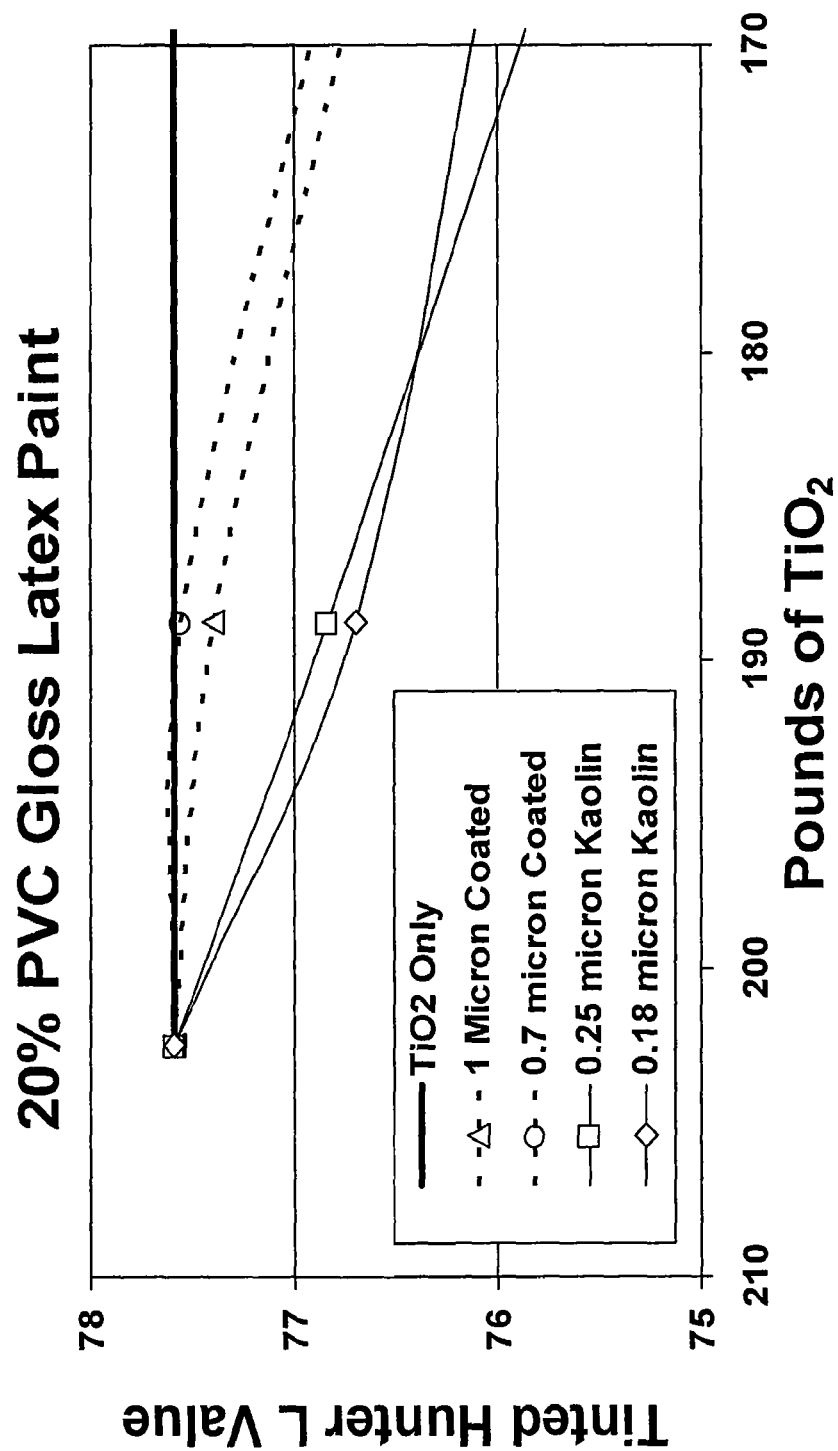
FIG. 11 a graph of tint strength vs. amount of $TiO_2$ content for several paint samples prepared with different pigments.

As shown in FIG. 11, the paints prepared using stearate coated calcium carbonate show less of a decrease in tint strength than those using either of the premium hydrous kaolins as a TiO₂ replacement.

Example 11

One sample of calcined Kaolin (Glomax LL, available from Imerys) was coated with Raybo 57 hydrophobizing agent and another was coated with a silane (Dynasylan OCTEO, available from Evonik Industries). Paints using these samples were made using the same 65% PVC formulation in Table VI.

TABLE VI

| 65% PVC formulation | |
|---|---|
| MATERIAL | LBS |
| WATER | 346.9 |
| KTPP | 1.8 |
| TAMOL 731 | 8.0 |
| IGEPAL CO-610 | 4.0 |
| COLLIDS 681F | 3.0 |
| TIO2(R-706) | 81.7 |
| #10 WHITE | 253.0 |
| GLOMAX LL | 199.9 |
| NATROSOL PLUS | 3.9 |
| Grind to 4NS | 902.2 |
| UCAR 379 | 211.0 |
| ETHYLENE GLYCOL | 25.0 |
| TEXANOL | 10.0 |
| WATER | 46.0 |
| Weight Solids | 55.7% |
| Volume Solids | 36.7% |

White and tinted paint optical data for films prepared using these samples is shown in Table VII.

TABLE VII

| | UNCOATED | FATTY ACID COATED | SILANE COATED |
|---|---|---|---|
| 60 Degree Gloss | 3.0 | 2.9 | 2.9 |
| 85 Degree Sheen | 2.7 | 2.6 | 2.3 |
| L | 95.3 | 94.9 | 94.7 |
| A | −0.6 | −0.7 | −0.7 |
| B | 1.9 | 2.3 | 2.1 |
| Opacity (Y) | 96.0 | 95.6 | 93.6 |
| Whiteness | 82.1 | 79.6 | 79.8 |
| Yellowness | 3.2 | 3.9 | 3.7 |
| 457 Brightness | 88.7 | 87.4 | 87.2 |
| BLUE TINT 11 Pounds blue to 100 gallons of paint | | | |
| L | 75.2 | 75.1 | 73.7 |
| a | −16.1 | −16.1 | −16.7 |
| b | −21.1 | −20.9 | −22.6 |
| Delta L | 0.0 | −0.1 | −1.5 |
| Delta a | 0.0 | −0.1 | −0.6 |
| Delta b | 0.0 | 0.2 | −1.5 |
| Delta E | 0.0 | 0.2 | 2.2 |

Figure 12:
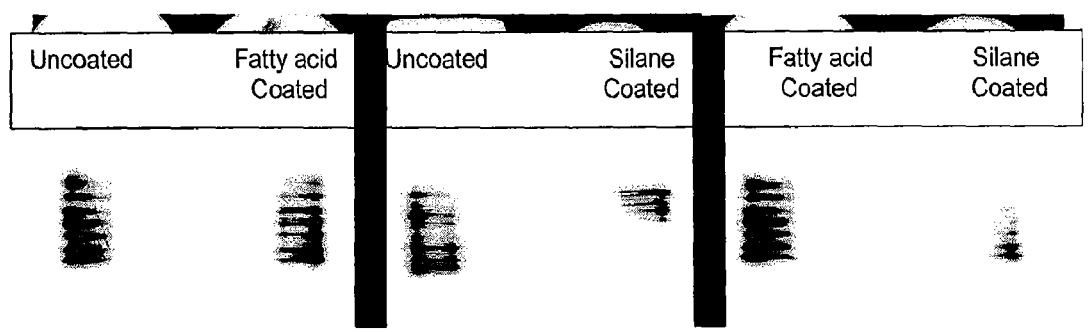
FIG. 12 shows scrub test results for paint samples comprising different pigments.

Scrub test results for these samples is shown in FIG. 12. Note that the scrub resistance, burnish and stain resistance of the samples using silane treated calcined kaolin are both better than either of the samples prepared using uncoated or fatty acid coated calcined kaolin.

Example 12

This example illustrates the utility of the hydrophobic treated minerals described herein to replace TiO₂ in aqueous paints.

A series of paint formulations were made as shown in Table VIII using varying amounts of TiO₂, and replacement pigments (to constant volume) including an uncoated 1 microns calcium carbonate (Camel-Cal ST), a hydrophobic, coated calcium carbonate (Imerseal 75) or two fine hydrous kaolin controls (0.25 micron kaolin (Polygloss 90, available from Kamin) and 0.18 micron hydrous kaolin (ASP G90, available from BASF/Engelhard).

TABLE VIII

| SEMI-GLOSS FORMULATION (20% PVC) | | | |
|---|---|---|---|
| 20% PVC Enamel | All TiO2 Control | | |
| MATERIAL | GALLONS | LBS | |
| WATER | 13.38 | 111.46 | |
| COLLOIDS 226 | 0.81 | 7.43 | |
| IGEPAL CO-630 | 0.32 | 2.79 | |
| AMP-95 | 0.46 | 3.72 | |
| COLLIDS 691 | 0.77 | 5.57 | |
| TiO₂ (R-706) | 6.08 to 4.56 | 202 to 151 | Constant volume of |
| CaCO₃ or Kaolin | 0 to 1.52 | variable | 6.08 Gallons |
| NATROSOL PLUS | 0.30 | 2.79 | |
| GRIND TOTALS | 22.11 | 336.24 | |
| AQUAMAC 440 | 56.16 | 483.00 | |
| ETHYLENE GLYCOL | 3.00 | 27.87 | |
| TEXANOL | 4.96 | 36.39 | |
| WATER | 13.38 | 111.46 | |
| ACRYSOL TT-935 | 0.16 | 1.39 | |
| AMMONIA | 0.22 | 1.86 | |
| TOTAL PAINT | 100.00 | 998.22 | |

Films were made using these samples, and contrast ratio (i.e., opacity) was measured for these films as previously described. The results are shown in FIGS. 13 and 14.

Figure 13:
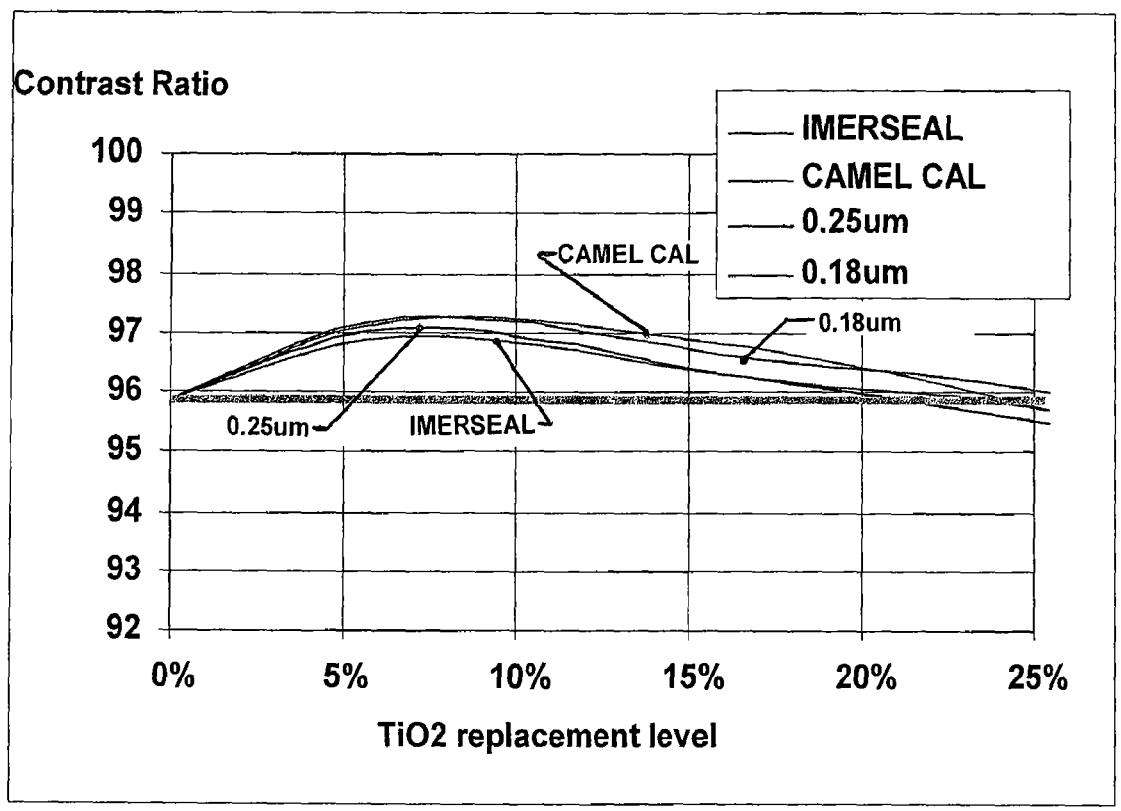
FIG. 13 is a graph of contrast ratio vs. $TiO_2$ replacement level for several paint formulations.
Figure 14:
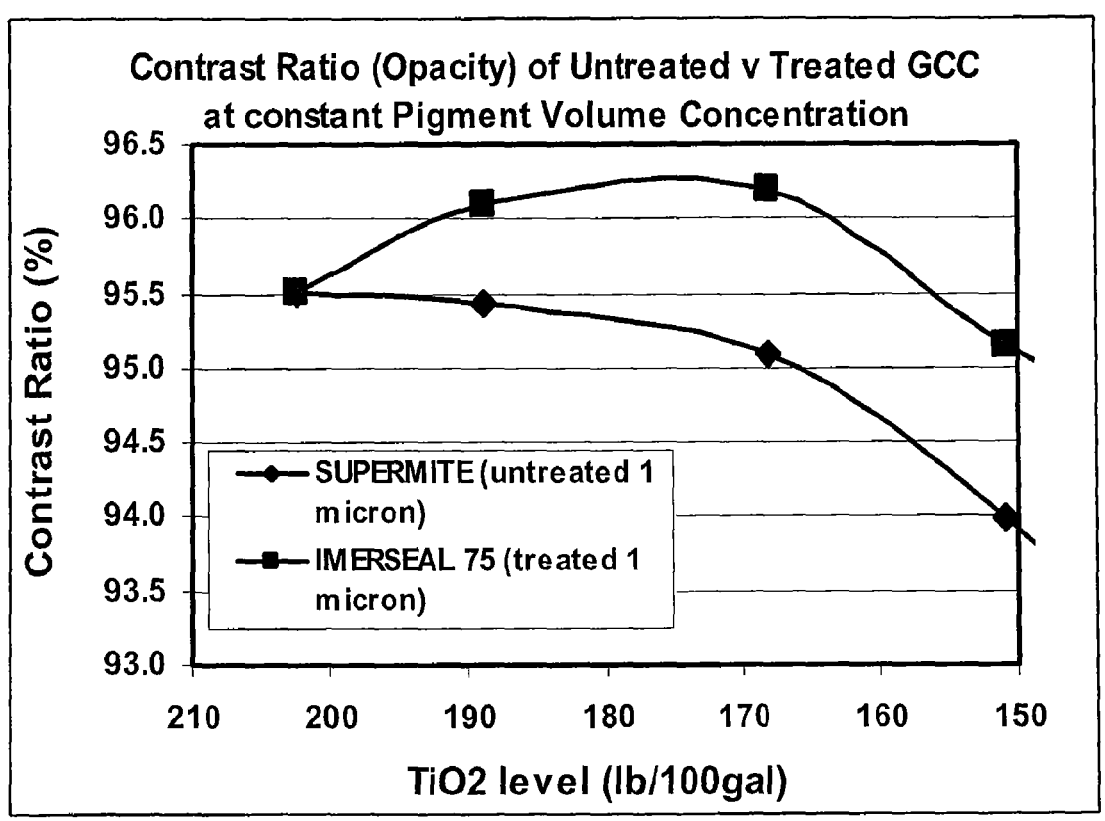
FIG. 14 is a graph of contrast ratio vs. $TiO_2$ level for pigments including untreated and treated ground calcium carbonate.

As can be seen in FIGS. 13 and 14, the replacement of a portion of the TiO₂ in an aqueous paint formulation with a hydrophobically coated mineral as described herein (in this example, a hydrophobically coated calcium carbonate) can unexpectedly provide an opacity equal to, or in some cases, even surpassing, that of an equal volume of TiO₂. Without wishing to be bound by theory, it is hypothesized that this increase in opacity may be the result of an improvement of the spacing of the TiO₂ in the formulation.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making water-based paint, the method comprising:
    treating at least one mineral with at least one hydrophobizing agent, such that the at least one hydrophobizing agent is reacted with the at least one mineral; and
    combining the at least one treated mineral with a binder, wherein the water-based paint comprises at least one of textured paint, latex paint, and acrylic paint, and wherein the at least one mineral and the at least one hydrophobizing agent comprise at least 10% by volume of the composition.

2. The method of claim 1, wherein the water-based paint comprises latex paint.

3. The method of claim 1, wherein the at least one mineral is chosen from clay, kaolin, mica, titanium dioxide, talc, natural silica, synthetic silica, natural silicates, synthetic silicates, feldspars, nepheline syenite, wollastonite, diatomite, barite, glass, and calcium carbonate.

4. The method of claim 3, wherein the at least one mineral comprises kaolin.

5. The method of claim 3, wherein the at least one mineral comprises calcium carbonate.

6. The method of claim 1, wherein the at least one hydrophobizing agent is chosen from fatty acids, fatty amines, and silanes.

7. The method of claim 1, wherein the at least one hydrophobizing agent is chosen from metal stearates, ammonium stearate, titanate coupling agents, silicones and organo-silicones, organo-silanes, fluorocarbons, fatty acid amines and amides, quaternary amine compounds, hydrocarbon oils, hydrocarbon waxes, hydrocarbon resins, zirconium compounds, maleic anhydride, maleic anhydride grafted polymers, modified polyethylene, polypropylene, carboxylated polybutadiene, and organometallic compounds.

8. The method of claim 1, wherein the at least one hydrophobizing agent comprises at least 0.2% by weight of the at least one mineral.

9. The method of claim 1, wherein the binder comprises at least one polymer or copolymer based on synthetic resins, natural resins, acrylics, polyurethanes, polyesters, melamine resins, epoxies, and oils.

10. A water-based paint composition made according to a method comprising:
   treating at least one mineral with at least one hydrophobizing agent, such that the at least one hydrophobizing agent is reacted with the at least one mineral; and
   combining the at least one treated mineral with a binder,
   wherein the water-based paint comprises at least one of textured paint, latex paint, and acrylic paint,
   wherein the water-based paint comprises: the at least one mineral treated with the at least one hydrophobizing agent, at least one particulate $TiO_2$ pigment, and the binder, wherein a film formed from the water-based paint composition has a contrast ratio at least about 0.1% higher than a similar water-based paint composition wherein the at least one mineral treated with at least one hydrophobizing agent is replaced with an equal volume of said particulate $TiO_2$ pigment, and
   wherein the at least one mineral and the at least one hydrophobizing agent comprise at least 5% by volume of the composition.

11. The composition of claim 10, wherein the water-based paint composition comprises latex paint.

12. The composition of claim 10, wherein at least one mineral is chosen from clay, kaolin, mica, talc, natural silica, synthetic silica, natural silicates, synthetic silicates, feldspars, nepheline syenite, wollastonite, diatomite, barite, glass, and calcium carbonate.

13. The composition of claim 12, wherein the at least one mineral comprises kaolin.

14. The composition of claim 12, wherein the at least one mineral comprises calcium carbonate.

15. The composition of claim 10, wherein the at least one hydrophobizing agent is chosen from fatty acids, fatty amines, and silanes.

16. The composition of claim 10, wherein the at least one hydrophobizing agent is chosen from metal stearates, ammonium stearate, titanate coupling agents, silicones and organo-silicones, organo-silanes, fluorocarbons, fatty acid amines and amides, quaternary amine compounds, hydrocarbon oils, hydrocarbon waxes, hydrocarbon resins, zirconium compounds, maleic anhydride, maleic anhydride grafted polymers, modified polyethylene, polypropylene, carboxylated polybutadiene, and organometallic compounds.

17. The composition of claim 10, wherein the at least one hydrophobizing agent comprises at least 0.2% by weight of the at least one mineral.

18. The composition of claim 10, wherein a film formed from the water-based paint composition has a contrast ratio at least about 0.5% higher than a similar water-based paint composition wherein the at least one mineral treated with at least one hydrophobizing agent is replaced with an equal volume of said particulate $TiO_2$ pigment.

19. The composition of claim 10, wherein a film formed from the water based paint composition has a contrast ratio at least about 1% higher than a similar water-based paint composition wherein the at least one mineral treated with at least one hydrophobizing agent is replaced with an equal volume of said particulate $TiO_2$ pigment.

20. A method of making water-based paint, the method comprising:
   providing at least one mineral treated with at least one hydrophobizing agent reacted with the at least one mineral; and
   combining the at least one treated mineral with a binder and at least one particulate $TiO_2$ pigment,
   wherein the water-based paint comprises at east one of textured paint, latex paint, and acrylic paint,
   wherein a film formed from the water-based paint composition has a contrast ratio at least about 0.1% higher than a similar water-spaced composition wherein the at least one mineral treated with at least one hydrophobizing agent is replaced with an equal volume of said particulate $TiO_2$ pigment, and
   wherein the at least one mineral and the at least one hydrophobizing agent comprise at least 5% by volume of the water-based paint.

21. The method of claim 20, wherein the water-based paint comprises latex paint.

22. The method of claim 20, wherein the at least one mineral is chosen from clay, kaolin, mica, titanium dioxide, talc, natural silica, synthetic silica, natural silicates, synthetic silicates, feldspars, nepheline syenite, wollastonite, diatomite, barite, glass, and calcium carbonate.

23. The method of claim 22, wherein the at least one mineral comprises kaolin.

24. The method of claim 22, wherein the at least one mineral comprises calcium carbonate.

25. The method of claim 20, wherein the at least one hydrophobizing agent is chosen from fatty acids, fatty amines, and silanes.

26. The method of claim 20, wherein the at least one hydrophobizing agent is chosen from metal stearates, ammonium stearate, titanate coupling agents, silicones and organo-silicones, organo-silanes, fluorocarbons, fatty acid amines and amides, quaternary amine compounds, hydrocarbon oils, hydrocarbon waxes, hydrocarbon resins, zirconium compounds, maleic anhydride, maleic anhydride grafted polymers, modified polyethylene, polypropylene, carboxylated polybutadiene, and organometallic compounds.

27. The method of claim 20, wherein the at least one hydrophobizing agent comprises at least 0.2% by weight of the at least one mineral.

28. The method of claim 20, wherein the at least one mineral and the at least one hydrophobizing agent comprise at least 10% by volume of the composition.

29. The method of claim 20, wherein the binder comprises at least one polymer or copolymer based on synthetic resins, natural resins, acrylics, polyurethanes, polyesters, melamine resins, epoxies, and oils.

30. A water-based paint composition made according to the method of claim 20, wherein the water-based paint comprises: the at least one mineral treated with the at least one hydrophobizing agent, the at least one particulate $TiO_2$ pigment, and the binder.

31. The composition of claim 30, wherein the water-based paint composition comprises latex paint.

32. The composition of claim 30, wherein at least one mineral is chosen from clay, kaolin, mica, talc, natural silica, synthetic silica, natural silicates, synthetic silicates, feldspars, nepheline syenite, wollastonite, diatomite, barite, glass, and calcium carbonate.

33. The composition of claim 32, wherein the at least one mineral comprises kaolin.

34. The composition of claim 32, wherein the at least one mineral comprises calcium carbonate.

35. The composition of claim 30, wherein the at least one hydrophobizing agent is chosen from fatty acids, fatty amines, and silanes.

36. The composition of claim 30, wherein the at least one hydrophobizing agent is chosen from metal stearates, ammonium stearate, titanate coupling agents, silicones and organosilicones, organo-silanes, fluorocarbons, fatty acid amines and amides, quaternary amine compounds, hydrocarbon oils, hydrocarbon waxes, hydrocarbon resins, zirconium compounds, maleic anhydride, maleic anhydride grafted polymers, modified polyethylene, polypropylene, carboxylated polybutadiene, and organometallic compounds.

37. The composition of claim 30, wherein the at least one hydrophobizing agent comprises at least 0.2% by weight of the at least one mineral.

38. The composition of claim 30, wherein a film formed from the water-based paint composition has a contrast ratio at least about 0.5% higher than a similar water-based paint composition wherein the at least one mineral treated with at least one hydrophobizing agent is replaced with an equal volume of said particulate $TiO_2$ pigment.

39. The composition of claim 30, wherein a film formed from the water based paint composition has a contrast ratio at least about 1% higher than a similar water-based paint composition wherein the at least one mineral treated with at least one hydrophobizing agent is replaced with an equal volume of said particulate $TiO_2$ pigment.

* * * * *